United States Patent

Searle et al.

[15] 3,640,468
[45] Feb. 8, 1972

[54] THRUST REVERSER FOR ASYMMETRIC EXHAUST EFFLUX DEFLECTION

[72] Inventors: Norman Searle, Marietta, Ga.; John W. Tatom, Franklin, Tenn.

[73] Assignee: Lockheed Aircraft Corporation, Burbank, Calif.

[22] Filed: Mar. 30, 1970

[21] Appl. No.: 23,826

[52] U.S. Cl.................239/265.29, 239/265.31, 239/265.35
[51] Int. Cl............................................B64c 15/06
[58] Field of Search...............239/265.13, 265.19, 265.27, 239/265.29, 265.31, 265.37, 265.35, 265.33

[56] References Cited

UNITED STATES PATENTS

| | | | |
|---|---|---|---|
| 2,753,684 | 7/1956 | Greene | 239/265.29 X |
| 2,620,622 | 12/1952 | Lundberg | 239/265.37 |
| 3,493,198 | 2/1970 | Roed | 239/265.27 X |
| 3,475,913 | 11/1969 | Mortlock et al. | 239/265.29 X |
| 3,002,343 | 10/1961 | Baird | 239/265.27 |
| 2,551,372 | 5/1951 | Haltenberger | 29/265.37 |

Primary Examiner—M. Henson Wood, Jr.
Assistant Examiner—John J. Love
Attorney—John J. Sullivan and George C. Sullivan

[57] ABSTRACT

A scheme for increasing thrust reverser utilization particularly on STOL aircraft is provided whereby all of the exhaust efflux being diverted is deflected in an asymmetric direction away from the plane of the engine intake air. Exhaust ingestion is thereby reduced allowing more effective reversers to be used down to lower speeds with consequent reductions in ground roll of the aircraft. Preferably, this asymmetric deflection of the exhaust efflux is directed upwardly at an angle to the horizontal to produce an additional load on the landing gear due to the vertical component of the reverse thrust enabling greater wheel-braking force to be applied for a given wheel ground friction coefficient.

5 Claims, 9 Drawing Figures

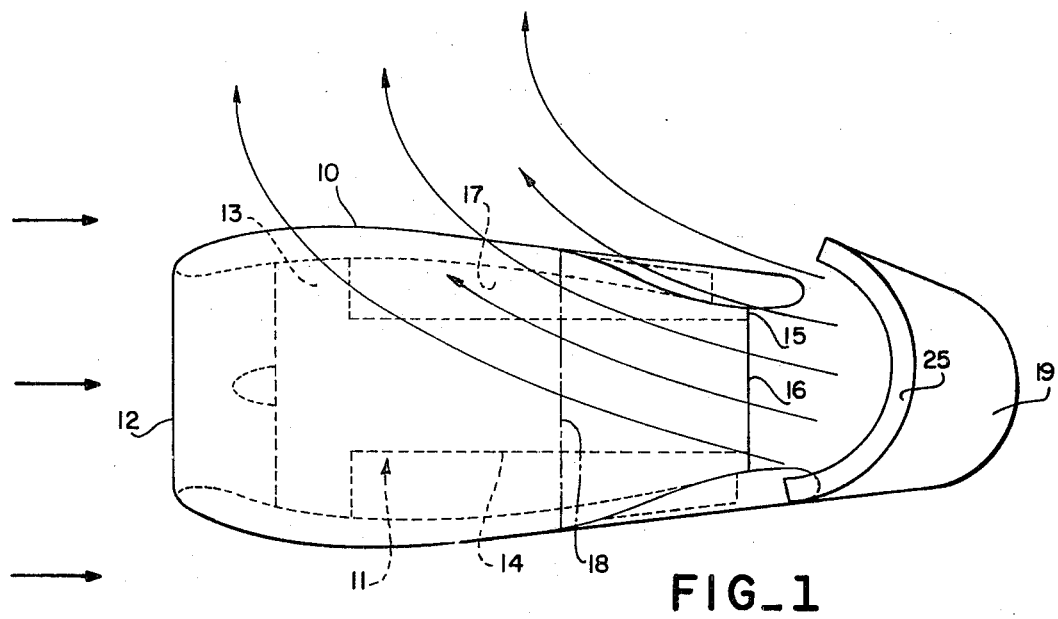
FIG_1
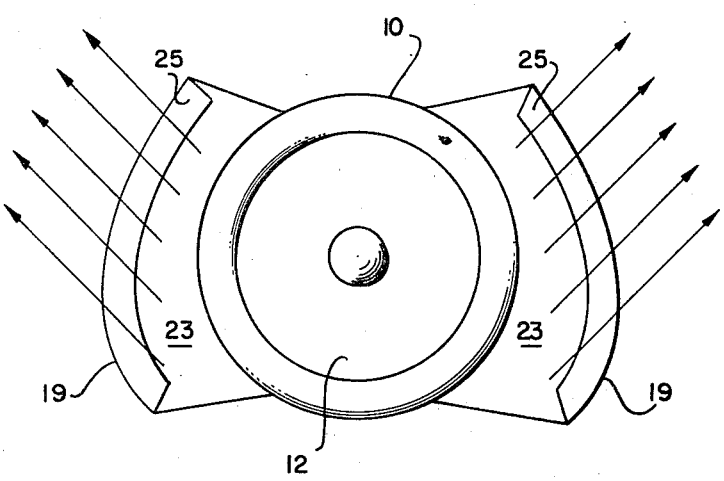
FIG_2

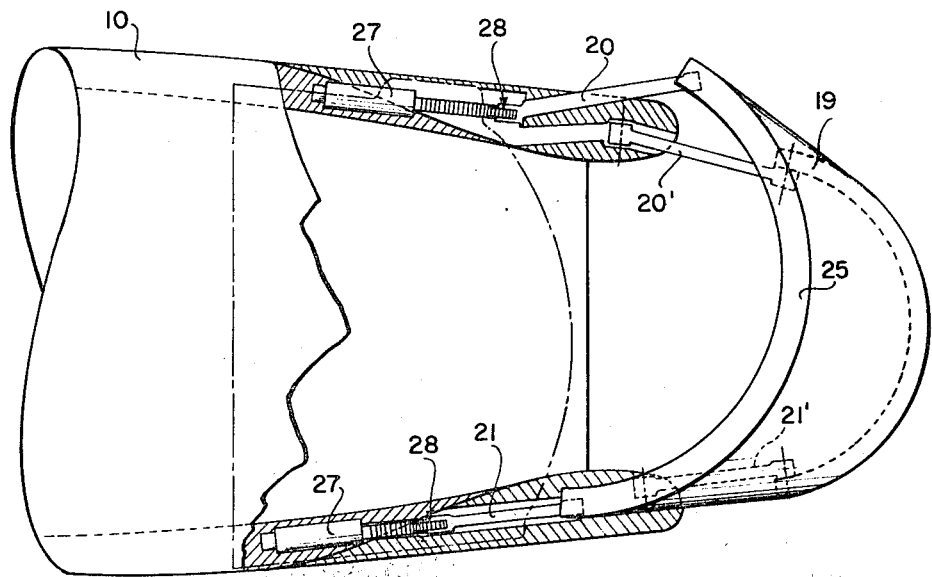
FIG_3
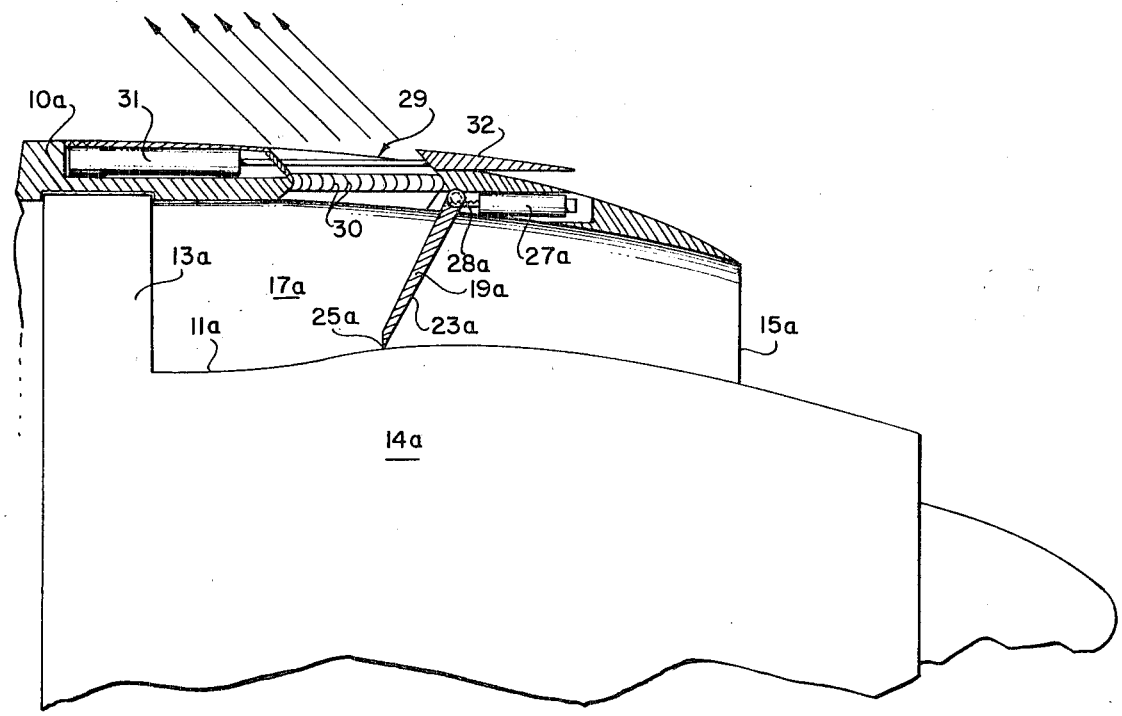
FIG_8

PATENTED FEB 8 1972
3,640,468
SHEET 3 OF 4
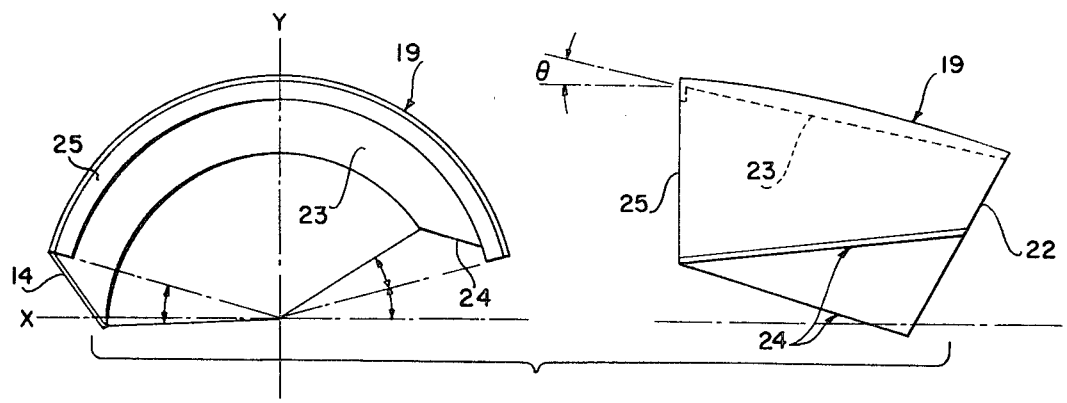
FIG_5
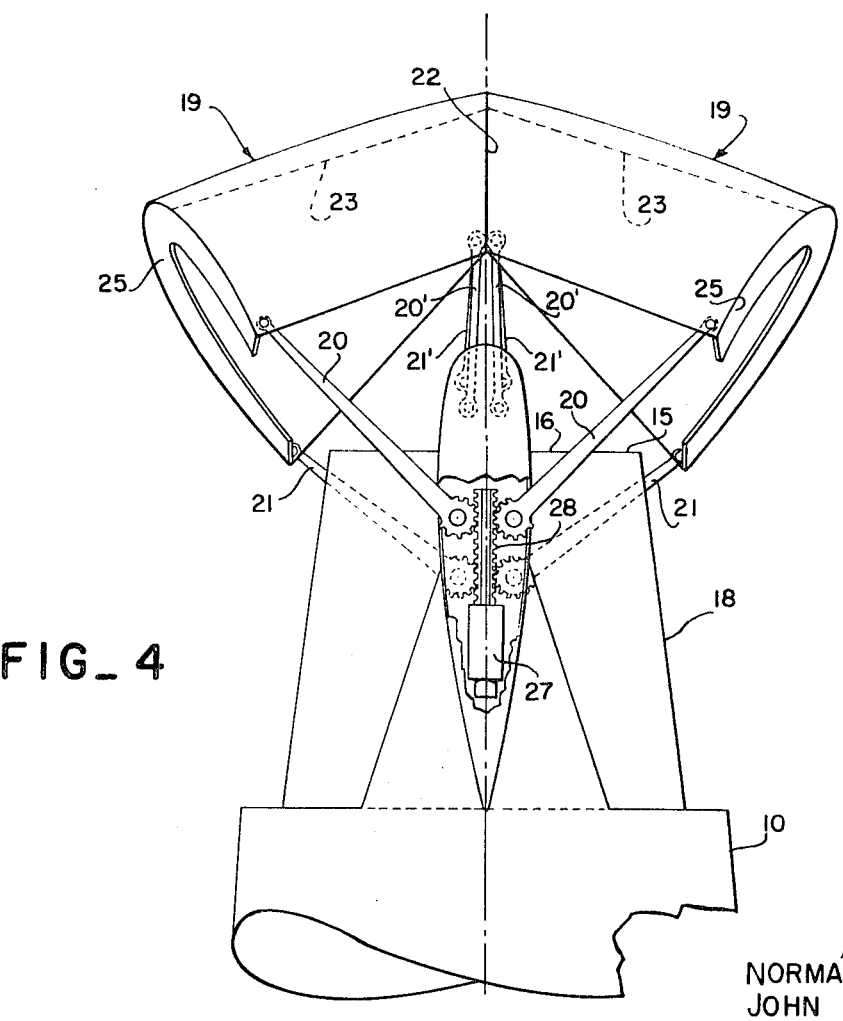
FIG_4
INVENTORS
NORMAN SEARLE
JOHN W. TATOM
By George C Sullivan, agent
John J Sullivan
Attorney PATENTED FEB 8 1972
3,640,468
SHEET 4 OF 4
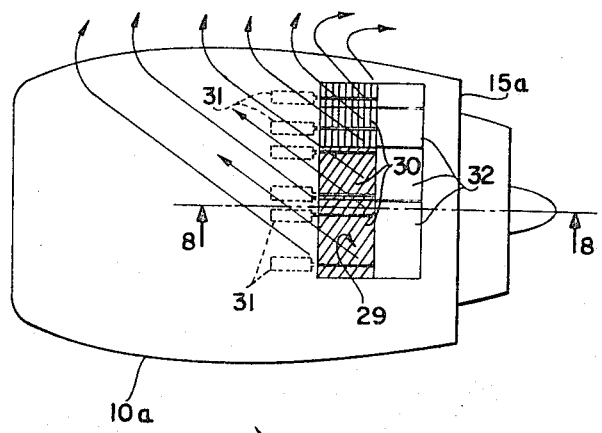
FIG_6
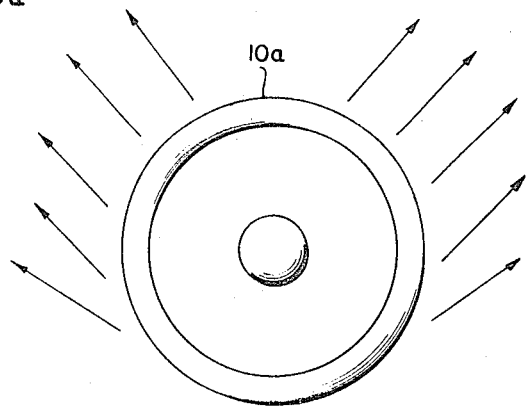
FIG_7
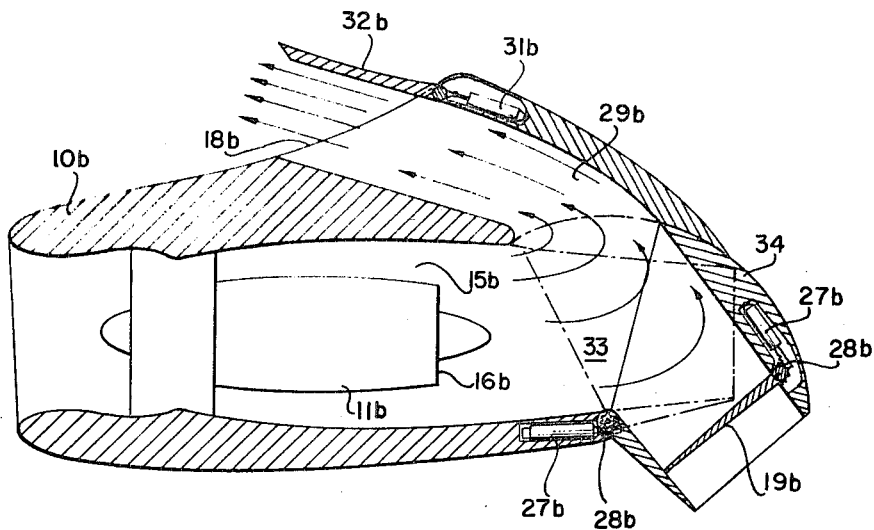
FIG_9
INVENTORS
NORMAN SEARLE
JOHN W. TATOM
By George C Sullivan, agent
John J. Sullivan
Attorney

THRUST REVERSER FOR ASYMMETRIC EXHAUST EFFLUX DEFLECTION

This invention relates to thrust reversers employed on jet aircraft to reduce landing distance, i.e., ground roll of the aircraft from the point of touchdown to complete rest, and more particularly to such a thrust reverser especially designed and constructed to direct all of the thrust reverser efflux in a direction at a preselected angle relative to the oncoming free airstream so that it is swept away from the engine inlet or inlets thereby.

In addition to the alleviation of reingestion provided by the present thrust reverser, another significant advantage is that all of the diverted exhaust efflux may be made to deflect asymmetrically upward to produce a downward component on the aircraft. This produces a greater load on the wheels and a consequent increase in braking capability with a given tire ground friction coefficient.

For conventional turbofan and turbojet aircraft with low thrust to weight ratios of around 0.2 to 0.3, the influence of thrust reversers in reducing landing distance is only moderate particularly when exhaust efflux ingestion, flap drag reduction, and practical pilot operation delays are considered. With current technology, the use of thrust reversers reduces landing lengths over those with braking alone by about 15 to 20 percent. Additionally, because of exhaust efflux ingestion and increasing design complexity, practical thrust reversers presently in operation are limited to about 40 percent effectiveness. Thus, due to the fact that relatively modest decreases in landing distance can be gained only through substantial difficulty and increased weight, any appreciable improvements in thrust reverser effectiveness for conventional aircraft have not been forthcoming.

For STOL aircraft, primarily because of the high thrust-to-weight ratio and the fact that these aircraft are designed around more stringent landing and takeoff requirements, the benefits to be gained for developing highly effective thrust reverser systems becomes significantly greater than before. The main problem in increasing the thrust reverser effectiveness is avoiding exhaust ingestion at low speed. In order to avoid engine stalling, current aircraft are compelled to turn off or cut back on their thrust reversers at ground speeds of 50 to 60 knots. This is only a little below the presently projected STOL touchdown speed which is on the order of about 70 knots.

The present invention proposes to reduce and possibly eliminate exhaust efflux ingestion by orienting the thrust reverser efflux at an angle relative to the approaching airflow so that the exhaust jets will be deflected laterally where they are swept aft by the airstream. For a target-type thrust reverser, so called because of the shape it assumes when deployed, i.e., a target external to the aft end of the engine that deflects engine exhaust gases, this can be accomplished either by pitching the conventional type of deflector or bucket to some small positive angle or designing the bucket to include an asymmetrically sloped surface to receive the exhaust flow and give it a lateral component of velocity.

If a cascade-type thrust reverser system is used, the same effect can be accomplished by blocking off the lower part of the cascade and pitching the vanes on the sides of the nacelle to direct the flow forward and to one side with respect to the long axis of the engine. The present concept lends itself very well to the integrated thrust high lift systems now being considered for STOL aircraft and a very high effectiveness is possible using this type of configuration.

In addition to reducing exhaust efflux ingestion, the present invention can be employed to help to eliminate the problem of engine dust ingestion and pilot visibility due to reverse flow impingement on the ground especially when landing on unsurfaced airstrips.

Another significant criticism of conventional thrust reversers is in the case where they are employed on wing mounted engines. In such applications, the thrust reverser efflux blocks off the free stream air to the flaps, so that any benefit gained from the thrust reversers tend to be offset by reduced flap drag. Deflecting all of the thrust reverser efflux up and over the wing reduces this problem and at the same time assists in spoiling wing lift. The additional load on the landing gear due to the vertical component of the reverse thrust also enables a greater wheel-braking force to be applied for a given wheel ground friction coefficient, thus further assisting in landing length reduction. Even with no increase in thrust reverser effectiveness and ignoring the effects of wing lift and flap drag, pitching the thrust reverser efflux up at a small angle can actually increase the total retarding of the wheels and propulsion system, typically by as much as 3 percent for a surface with a friction coefficient of 0.25.

With the above and other objects in view as will be apparent, this invention consists in the construction, combination, and arrangement of parts all as hereinafter more fully described, claimed, and illustrated in the accompanying drawings wherein:

FIG. 1 is a general longitudinal view of an engine nacelle modified so as to incorporate a target type of thrust reverser designed and constructed in accordance with the teachings of the present invention, the deflector or bucket being illustrated in the fully deployed position to show the asymmetric deflection of the entire exhaust efflux from the engine;

FIG. 2 is a front view or a view from the left of FIG. 1 to show the elements of the bucket disposed on opposite sides of the engine nacelle with their deflecting surfaces angled to effect the asymmetric deflection of the exhaust efflux;

FIG. 3 is a view similar to FIG. 1 of the aft end only of the engine nacelle at an appreciably larger scale and including details by which the thrust reverser is actuated;

FIG. 4 is a view similar to FIG. 3, the nacelle having been rotated 90°;

FIG. 5 is a detail showing a side and front elevation of one of the deflector elements or doors and the lines of construction thereof to produce the skewed sections of a conical surface which butts with the corresponding surface of the other deflector element to form the bucket configuration of FIGS. 1 through 4;

FIG. 6 is a side elevation of an engine nacelle modified so as to incorporate a cascade type of thrust reverser following the teachings of this invention, the deflector elements or vanes on opposite sides of the nacelle being shown in the fully open position to show the upward deflection of the exhaust efflux from the engine fan;

FIG. 7 is a front view or a view from the left of FIG. 6;

FIG. 8 is a section taken along line 8—8 of FIG. 6 to show primarily the details of the deflector elements and actuating mechanism; and FIG. 9 is a side elevation of an integrated thrust/high lift engine nacelle modified so as to incorporate a thrust reverser in accordance with the present invention, the deflector or blocker door associated with the engine tailpipe being closed and the forwardly oriented exhaust outlets being fully open to discharge the entire exhaust efflux therethrough.

Referring more specifically to the drawings and to the target-type embodiment of the invention shown in FIGS. 1 through 5, 10 designates a nacelle enclosing and housing a turbojet or turbofan engine 11 typical of one employed in an aircraft (not shown). At its forward end, the nacelle 10 terminates in an air inlet 12 common to both the fan 13 and to the core engine 14. At its aft end, the engine 11 terminates in exhaust nozzles 15 and 16 for the discharge of efflux produced by the fan and passing through a duct 17 and by the core engine 14 respectively. The mounting of the nacelle 10 to the aircraft may be accomplished in any suitable manner, oftentimes it being connected by suitable supporting structure such as a pylon under a wing or other appropriate component of the aircraft none of which structure or location per se constitutes a part of the instant invention.

At its aft end on opposite sides thereof, the nacelle 10 is recessed as at 18 and a movable segment constituting a blocker door 19 is adapted to lie within each such recess 18 conforming on its outer peripheral surface with the adjacent nacelle surface. Each such segment or door 19 is pivotally connected adjacent its forward end to the nacelle structure by means of a pair of actuating links 20 and 21 and adjacent its aft end by a corresponding pair of idler links 20' and 21'. The idler links 20' and 21' are substantially shorter than the actuating links 20 and 21 in order to dispose the adjacent edges 22 of the doors 19 into abutment when deployed. Also the links 20 and 20' are longer than the links 21 and 21' in order to simultaneously pitch the respective doors 19 to the required angle for reasons to become more apparent.

Referring more particularly to FIG. 5, each segment or door 19 is defined by an internal surface 23 which forms part of the surface of a cone with the edges 24 of this surface cut at an angle to the cone axis. It is this edge angle cut that determines the ultimate pitch of the door 19 which is predetermined and is a function of the nacelle/wing geometry of the particular aircraft. The forward edge 25 of each door 19 is configured to abut the corresponding edge of its recess or cutout 18 when each door 19 is disposed in the stowed or inoperative position at which time the cone axis becomes coincident with the nacelle axis. Due to the unequal length of the actuating links or arms 20 and 21 and idler links 20' and 21', the doors 19 are tilted during their deployment so that they are disposed in the desired position when fully deployed with their adjacent edges 22 in abutment to locate the crotch of the bucket substantially normal to the nacelle axis. Such deployment may be accomplished by any suitable power means, such as for example, an actuator 27 driving a linear member 28 in the form of a rack and pinion engagement.

In view of the foregoing construction and arrangement, it is apparent that during normal flight of the aircraft, the doors 19 are stowed within the confines of the engine nacelle 10 so as to form an aerodynamically clean profile. Upon operation of the thrust reverser, however, by operation of the actuators 27 these doors 19 are extended aftwardly on opposite sides of the fan and engine exhaust nozzles 15 and 16 with their efflux-deflecting surfaces 23 pitched at a selected angle to direct the entire thrust forwardly and asymmetrically relative to each longitudinal plane of the engine 11 where it is swept aft and away by the airstream. The exhaust products are, therefore, prevented from reentering the inlet 12 of the engine 11 and, in the case of multiple such engines 11, the inlet 12 of the next adjacent engine or engines 11. At the same time, by tilting the surfaces 23 in a generally upward direction the exhaust may be made to produce a component of thrust directed downwardly to impose additional loads on the landing surfaces tending to supplement braking action.

For all intents and purposes of the present invention, the same end result is obtained by means of and through the arrangements illustrated in FIGS. 6 through 9. In the embodiment illustrated in FIGS. 6 through 8, the engine nacelle 10a is provided on each side with an opening 29 in which a plurality of deflector vanes 30 is mounted in conventional manner. An actuator 31 and closure member 32 are associated with each cutout or opening 29, the member 32 being employed to cover and uncover the adjacent vanes 30 by linear movement effected by operation of the actuator 31. Thus, in one extreme position the member or closure 32 fills the opening 29 overlying the associated vanes 30 and forming a smooth continuation of the nacelle surface. In its other extreme position, the closure 32 is disposed aft of the opening 29 overlying the adjacent nacelle surface and exposing the associated vanes 30.

Adjacent each opening 29 pivotally mounted to the nacelle structure is a blocker door 19a which is adapted to swing under the influence of an actuator 27a and drive member 28a to and from positions within the nacelle structure and extending outwardly therefrom across the fan air duct 17a. To facilitate this, each door 19a is formed or otherwise provided with a surface 23a that is contoured to form a smooth continuation of the adjacent surface of the nacelle 10a when disposed in its inoperative position within the nacelle structure. Also, the forward edge 25a of each door 19a is configured to abut at each point in its length the external surface of the engine core 14a when disposed in its operative position across the fan air duct 17a. The corresponding edge of the nacelle 10a defining the opening 29 is similarly configured. Since the duct 17a is annular, the door 19a may be comprised of a plurality of leaves with overlapping edges following conventional design and construction to permit an effective orifice opening of variable size corresponding to its operative, inoperative and intermediate positions.

In view of the foregoing construction and arrangement all of the exhaust efflux from the fan 13a and passing through the duct 17a is either made to discharge from the fan nozzle 15a when the thrust reverser is inoperative or through the vanes 30 when the thrust reverser is operative. In the latter case, all of the efflux being diverted is directed in a generally forward and lateral direction asymmetrically with respect to a preselected longitudinal plane of the engine 11a into the airstream whereby it is swept aft.

In the embodiment shown in FIG. 9, the exhaust efflux from the engine 11b is discharged at the aft end through the fan and engine exhaust nozzles 15b and 16b. The engine nacelle 10b is provided on its upper side with an opening 29b which communicates with the exhaust duct 33 of the engine into which the fan and engine nozzles 15b and 16b discharge. An actuator 31b and closure 32b are associated with the opening 29b, closure 32b being employed to cover and uncover the opening 29b by a swinging movement effected by operation of the actuator 31b. Thus, in one extreme position the closure 32b overlies the opening 29b and forms a smooth continuation of the nacelle surface. In the other extreme position, the closure 32b is disposed outwardly of the opening 29b and laterally of the nacelle extending therefrom in a generally forward direction.

Rotatably mounted in the nacelle structure defining the exhaust duct 33 in any conventional manner is a thrust vector control mechanism 34 which serves to modify the angle of the thrust efflux from the engine 11b by appropriate rotary mechanism (not shown) so that the discharge therefrom can be directly aft or at some vertically downward angle relative to the horizontal. When located in the aft discharging direction, this mechanism 34 overlies and closes the opening 29b; however, when rotated downwardly it uncovers the opening 29b and allows an expansion of the engine exhaust efflux therethrough.

Associated with the control mechanism 34 is a deflector element or blocker door 19b which is adapted to swing under the influence of an actuator 27b and drive 28b to and from extreme positions where it is contained within the walls defining the duct 33 and extending laterally therefrom to totally block the discharge opening from the duct 33. When the blocker door 19b is located in the latter position, the exhaust efflux leaving the engine 11b is deflected thereby through the opening 29b and with the closure 32b in the open position reverse thrust is effected by the discharge of such exhaust efflux out from the nacelle 10b through the opening 29b in a generally forward direction.

While specific embodiments of the invention have been disclosed herein, it is to be understood that numerous adaptations, modifications and substitutions may be utilized without departing from the scope of the invention.

What is claimed is:

1. A thrust reverser for turbofan and turbojet aircraft comprising a pair of deflector elements disposed adjacent the exhaust discharge end of an engine of said aircraft diametrically opposite one another with respect to said engine, and an actuator to move each said deflector element to and from respective positions totally unobstructing and totally obstructing said exhaust discharge end, each said deflector element including an external surface that conforms to and is adapted to be disposed within the plane of the external surface of the engine when located in the unobstructing position aforesaid and at least one internal surface, the internal surfaces of both deflector elements being angularly and asymmetrically disposed relative to the engine exhaust axis when said deflector element is located in the obstructing position aforesaid to direct all of the engine exhaust in a lateral, generally forward direction of the aircraft.

2. The thrust reverser of claim 1 wherein each said deflector element includes an internal surface in the form of a cone section, the edges of said elements being cut at an angle to the cone section axis and the cone section axis being coincident with the engine axis when said external surface is disposed as aforesaid and said edges being disposed in abutment to define a crotch that is substantially normal to the exhaust axis when said deflector elements are located in the totally obstructing position aforesaid.

3. The thrust reverser of claim 1 including a set of louvers associated with each said deflector element and disposed within the planes of the external and internal engine surfaces around and defining said exhaust discharge end, a movable closure covering each said set of louvers when said deflector elements are disposed in the totally unobstructing position aforesaid and actuator means to move said closures to a position uncovering said louvers when the deflector elements are disposed in the totally obstructing position aforesaid.

4. The thrust reverser of claim 2 including unequal length links connecting opposite ends of said deflector elements to said engine whereby movement of said elements in an aft direction effects a tilting thereof until the adjacent edges abut as aforesaid.

5. The thrust reverser of claim 4 wherein a first pair of links interconnect the forward ends of said deflector elements with said engine at both the top and bottom thereof and a second pair of links interconnect the aft ends of said deflector elements with said engine at both the top and bottom thereof, said first pair of links being longer than their corresponding second pair of links and the top links of each said pair of links being longer than the bottom links.

* * * * *